United States Patent [19]
Paelian et al.

[11] 3,788,133
[45] Jan. 29, 1974

[54] FORCE SENSING TRANSDUCER

[75] Inventors: Owen Paelian; Donald R. Rister; Richard L. Kellar, all of Huntsville, Ala.

[73] Assignee: Toroid Corporation, Huntsville, Ala.

[22] Filed: Aug. 25, 1972

[21] Appl. No.: 283,780

[52] U.S. Cl. .................................. 73/141 A, 338/5
[51] Int. Cl. ................................................ G01l 1/22
[58] Field of Search.......... 73/88.5 R, 141 A; 338/5; 177/211

[56] References Cited
UNITED STATES PATENTS
2,488,348  11/1949  Ruge ........................................ 338/5
2,998,089  8/1961  Ernst ............................. 73/141 AX
3,132,547  5/1964  Doyle et al. .................. 73/141 A X FOREIGN PATENTS OR APPLICATIONS
975,170  11/1964  Great Britain ................... 73/141 A

*Primary Examiner*—Charles A. Ruehl

[57] ABSTRACT

A force transducer consisting of a block of supporting material having a plurality of parallel cavities in which column shaped load cells having a small height to width ratio are mounted and wherein a thin hard sheet of material is bolted to the load cells. The load cells protrude over the surface of the block by an amount slightly larger than the deformation range of operation of the load cells.

6 Claims, 4 Drawing Figures

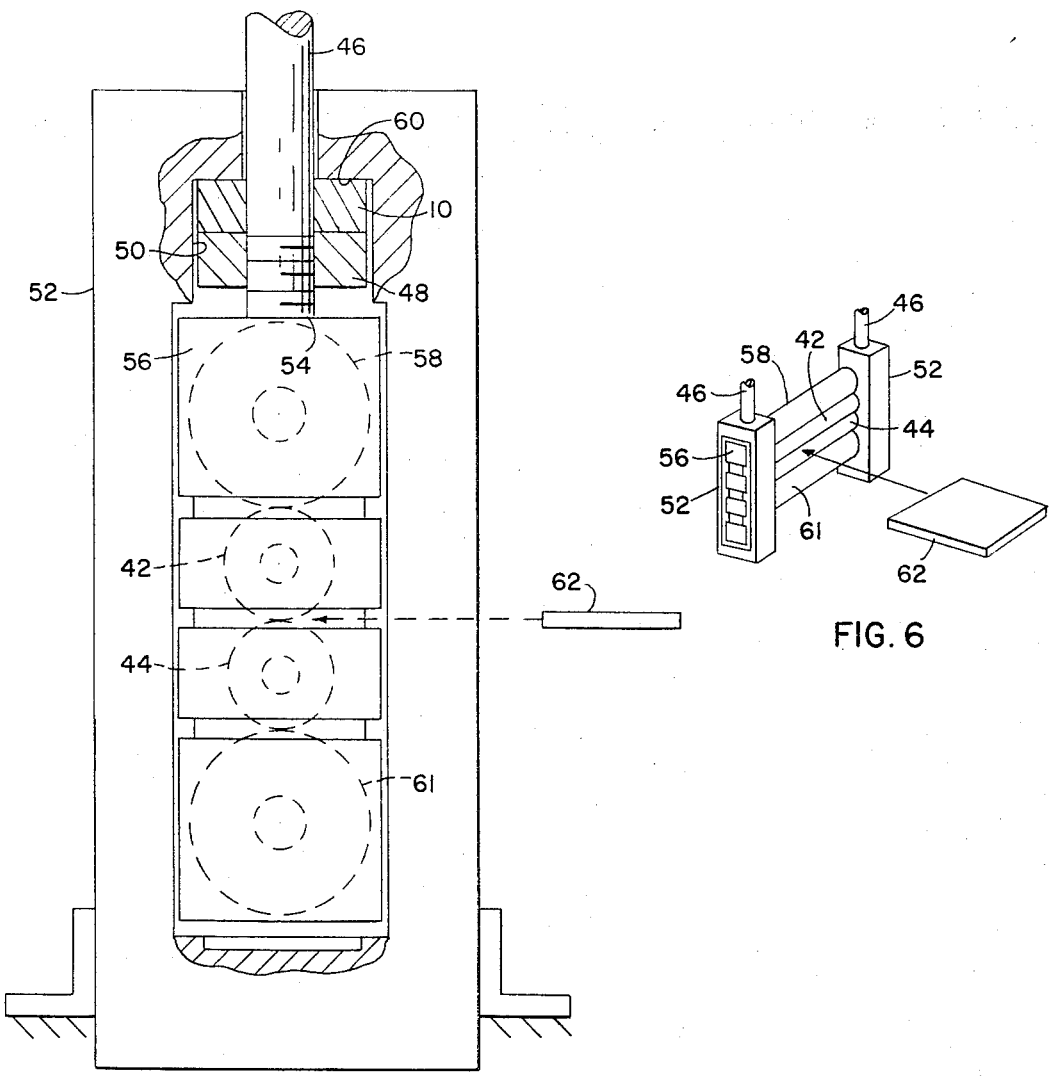
FIG. 7
FIG. 6
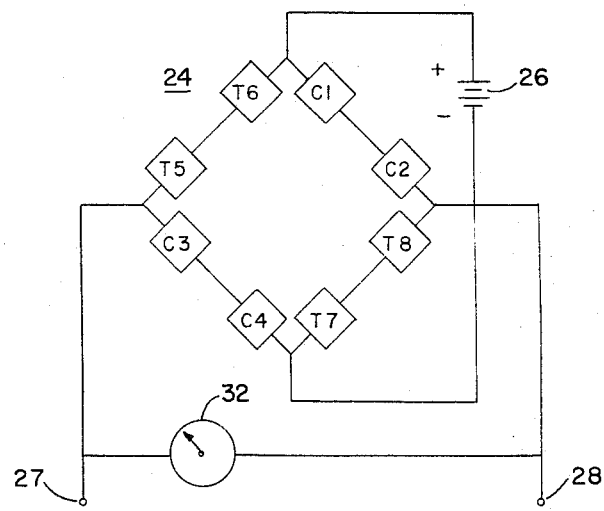
FIG. 5

3,788,133

FORCE SENSING TRANSDUCER

BACKGROUND OF THE INVENTION

The accurate measurement of large and changing forces in restricted spaces is difficult. A particular case in point is the continuous measurement of forces or loads applied to large roller assemblies used in steel mills in the process of forming sheet metal. In general the configuration of such roller assemblies is such that little room exists for the interpositioning of load sensing transducers in series between the source of the applied load and the rollers. It is believed that for this reason that conventional load cells which heretofore have depended for their accuracy on rather long (compared with width) masses of strain gaged steel, have not been widely employed. For example, known load cells having a capability of measuring one to four million pounds have dimensions along the direction of application of force of 12 to 60 inches which is simply too long for use in many steel rolling assemblies where only 4 to 6 inches are typically available for the transducer. Thus, steel mills have tended not to use strain gaged load cells for steel rolling assemblies, and instead have employed devices wherein the strain of a steel mass is sensed by variations in flux from extremely large currents passed through the steel mass.

SUMMARY OF THE INVENTION

As suggested above a particular problem in the use of strain gaged steel structures, or load cells, in restricted lengths has been that of obtaining sufficient accuracy and it has been previously thought that load cells must have a significantly longer length than width of active mass in order to achieve sufficient accuracy. The applicant has discovered, however, that contrary to such beliefs that by the employment of solid column shaped load cells and operating them over a deformation range of 0.05 to 0.2 percent of their length that ratios of length to diameter as low as 100 percent can provide accuracies of 0.15 to 0.50 percent. By paralleling a relatively few such loaded cylinders, from six to 14, enormous load capabilities can be achieved with length restrictions as low as four inches and thus substantially equal to the diameter of the cylinder.

A further difficulty overcome by the applicant's invention is that of overload protection which is achieved by positioning load cells in cavities in a load supporting block with only 0.06 to 0.24 percent of the length of the load cells extending over the surface of the block and thus momentary shock loads which substantially exceed the range of the load cells are bypassed through the block and the load cells are undamaged.

Still another feature of the invention is to employ a relatively hard, but thin, isolated plate bolted to the protruding end of the load cells. This plate in turn evenly couples an applied load to the load cells and in this fashion the integrity of the loading surface is protected and prevented from being deformed by repeated engagement with the load cells and thus the effective travel or deformation of the load cells before direct engagement between the load surface and the block is maintained. In this manner the point of overload protection, defined by the height of the load cells initially extending above the surface of the block in which they are positioned, is maintained constant over long periods of usage.

BRIEF DESCRIPTION OF DRAWINGS

FIG. 5 is an electrical schematic diagram of the interconnection of strain gages of the load cell elements.

FIG. 6 is a pictorial view of a roller assembly including transducers of the type illustrated in FIG. 1.

FIG. 7 is a side view of one of the stanchions of the roller assembly shown in FIG. 6 with a portion of the side cut away to illustrate the placement of a transducer and the manner in which force is applied to the rollers of the roller assembly.

DESCRIPTION OF THE PREFERRED EMBODIMENT

Figure 1:
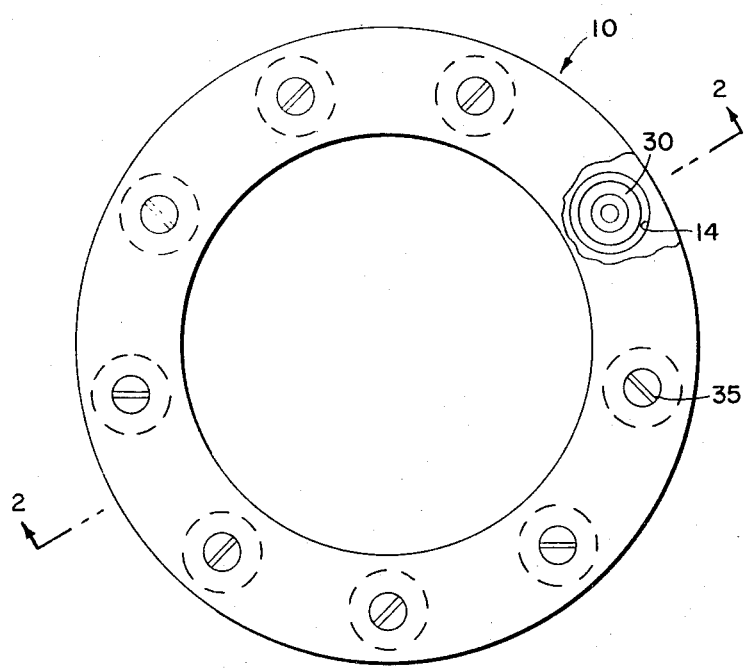
FIG. 1 is a plan view of a load or force transducer as contemplated by this invention.
Figure 2:
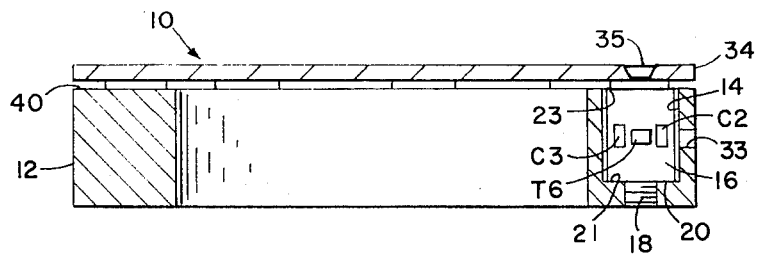
FIG. 2 is a sectional view along the line 2—2 of FIG. 1.
Figure 3:
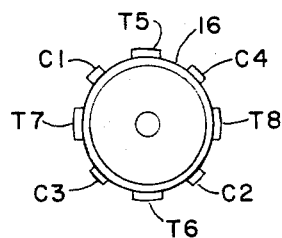
FIG. 3 is a top view of one of the load cell elements of the transducer illustrated in FIG. 1.
Figure 4:
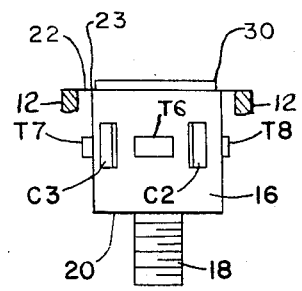
FIG. 4 is a side view of one of the load cell elements.

Referring to the drawings, force transducer 10 includes an annular steel block 12 into which there is cut a plurality of cavities 14. A like plurality of cylindrical load cells 16 are bolted by threaded shafts 18 into the bottom of the cavities with the bottom surface 20 of each load cell being firmly positioned against the bottom surface 21 of each cavity. Flexible annular ring 22 connects in a small indentation 23 in the top of each load cell 16 over the top edge of a cavity 14. This annular ring prevents the coupling of lateral forces to the load cell and seals the cavity around it. Each of the individual load cells have compression C and tension T strain gages positioned in a balanced configuration. Thus four each of compression strain gages C1–C4 and tension strain gages T5–T8 are affixed as shown in FIGS. 3 and 4. The height and diameter of load cell 16 are illustrated in FIG. 4 as being equal to demonstrate as stated above that the ratio of length-to-diameter may be as low as 100 percent, or 1. The strain gages are electrically resistive devices which increase resistance with tension and decrease resistance with compression. Like designated strain gages of each load cell are interconnected electrically in parallel to like designated gages of the other load cells and are connected as shown in FIG. 5 in a bridge circuit 24. As shown by bridge circuit 24, power is provided by power source 26 and bridge circuit 24 provides an electrical output on terminals 27 and 28 indicative of the load applied between the tops of load cells 16 and bottom of annular block 12. A visual indication of the force is provided by meter 32 connected across the output of bridge circuit 24 and appropriately calibrated in pounds or other units. Openings 33 provide an outlet for wires connected to the load cells.

A thin annular sheet washer or ring 34 of hard steel is bolted onto each load cell by bolts 35. Annular ring 34 provides a means of distributing the load applied to the load cells and prevents indentation into the surface of any loading member, not shown, by repeated application of force to the top surface of load cells 16. Such indentations would, of course, reduce the working gap between the top 40 of block 12 and the engaging surface of any loading member. This gap, which is preset by the distance which the tops of load cells extend above the top surface 40 of block 12 is the range of operation of the load cells. Any overloading tends to lower the tops of the load cells below the surface 40 of block 12 and this is also taken directly by block 12 and the load cells are thus protected. If this distance were effectively reduced by an indentation of the surface of the load applying member such that the tops of the load cells wore into the surface of the load applying member, range of operation would be reduced, an undesirable characteristic.

FIG. 7 illustrates generally a roller assembly for rolling sheet steel and in which it is desired to measure the force being applied by rollers 42 and 44 to steel being passed between them. Forces are adjusted by the rotation of identical shafts 46 which are each threaded into a vertically floating nut 48 (FIG. 7 positioned in cavity 50 in each of the stanchions 52, which nuts are locked against rotation by means not shown. The end 54 of each shaft engages a journal 56 supporting each end of upper drive roller 58. A transducer 10 is positioned between each nut 48 and an upper shoulder surface 60 of each stanchion. However, roller 61 (driven by means not shown) is rotatably supported, but otherwise rigidly mounted, at each end on stanchions 52. Rollers 42 and 44 are in engagement with rollers 58 and 61, respectively, and thus the force applied by shafts 46 to roller 58 is applied by rollers 42 and 44 to the steel ingot 62 to be rolled. This force is also applied to each transducer 10 and thus the load applied by the rollers to the steel ingot is measured.

Identically designated strain gages of each of the load cells of each transducer 10 are connected in parallel and then interconnected as shown in FIG. 5.

By adjustment of the load by means of the rotation of shafts 46, a desired load can thus be maintained. Normally, this would be accomplished by a servo system which would receive an input from output terminals 27 and 28 of each transducer, indicative of the applied force, compare the force to a desired force, and the servo system would rotate shafts 46 on appropriate directions to provide the correct loading by the rollers and on the ingot being rolled.

It has been found that in accordance with the present invention that the overall height of transducer 10 may be made quite small, and for example for loads of one to four million may be constructed with a height of only four to six inches and yet provide an accuracy of 0.15 to 0.50 percent.

What is claimed is:

1. A force sensing transducer comprising:
    a three dimensional body having first and second spaced opposite surfaces and having a plurality of parallel cavities opening out to said first surface;
    a strain responsive cylinder positioned in each of said cavities and wherein:
    one end of each said cylinder is supported by the bottom of a said cavity,
    the opposite end of a said cylinder extends above the surface surrounding the cavity in which it is positioned a distance of 0.05 to 0.2 percent of the height of said cylinder,
    an annular flexible ring interconnecting and separating a said cylinder from the sidewalls of a said cavity, and
    a plurality of strain responsive, electrically indicating, elements positioned on each said cylinder;
    whereby force applied between like ends of said cylinders and said second surface is sensed by said strain responsive elements and thereby said force is measured.

2. A force sensing transducer as set forth in claim 1 wherein said strain responsive elements are on the sidewalls of said cylinders, at least four of said strain responsive elements are positioned to register strain parallel to the axis of a said cylinder and at least four oppositely positioned strain sensitive elements are positioned to register strain perpendicular to the axis of said cylinder whereby axial force alone is measured while cancelling out any bending moments which are imposed on individual strain responsive cylinder.

3. A force sensing transducer as set forth in claim 1 wherein said cylinders are substantially solid and the height of each said cylinder is no greater than 1.0 times the diameter of a said cylinder.

4. A force sensing transducer as set forth in claim 3 wherein said three dimensional body comprises an annular ring.

5. A force sensing transducer as set forth in claim 4 further comprising:
    an annular washer of relatively hard material providing an interface between said strain responsive cylinders and a said first surface of any member applying force thereto,
    whereby any deformation of the surface of the member providing said applied force is isolated from a said first surface of a said annular ring and thus deterioration of operation by the lowering of the upper cutoff level of measurement is prevented.

6. In a force measurement assembly in which an adjustable force is applied to opposed rollers of a roller assembly adapted to flatten or reduce the thickness of an article and including a pair of shafts adapted to apply a force to opposite ends of one of said rollers with respect to a housing of a said roller asembly, an annular force transducer surrounding each of said shafts and positioned to be compressed by the force applied to said rollers wherein each said transducer comprises:
    an annular body having first and second spaced opposite surfaces and having a plurality of parallel spaced cavities opening out to said first surface;
    a strain responsive cylinder positioned in each of said cavities and wherein;
    one end of each said cylinder is supported by the bottom of a said cavity,
    the opposite end of a said cylinder extends above the said first surface surrounding the cavity in which it is positioned a distance of 0.05 to 0.2 percent of the height of said cylinder,
    an annular flexible ring interconnecting and separating a said cylinder from the sidewalls of a said cavity, and
    a plurality of strain responsive, electrically indicating, elements positioned on each said cylinder;
    whereby force applied between said opposite ends of said cylinders and said second surface of said annular body is sensed by said strain responsive elements and thereby said force applied to said rollers is measured.

* * * * *